(12) United States Patent
Murden

(10) Patent No.: US 9,021,626 B2
(45) Date of Patent: May 5, 2015

(54) SAFETY SHOWER

(71) Applicant: Chris D. Murden, Granbury, TX (US)

(72) Inventor: Chris D. Murden, Granbury, TX (US)

( * ) Notice: Subject to any disclaimer, the term of this patent is extended or adjusted under 35 U.S.C. 154(b) by 0 days.

(21) Appl. No.: 14/243,504

(22) Filed: Apr. 2, 2014

(65) Prior Publication Data

US 2014/0289956 A1 Oct. 2, 2014

Related U.S. Application Data

(60) Provisional application No. 61/807,648, filed on Apr. 2, 2013.

(51) Int. Cl.
*A47K 3/022* (2006.01)
*A47K 3/28* (2006.01)
*B05B 9/04* (2006.01)
*B05B 1/18* (2006.01)

(52) U.S. Cl.
CPC . *A47K 3/286* (2013.01); *B05B 1/18* (2013.01); *B05B 9/0409* (2013.01)

(58) Field of Classification Search
CPC .................................................... A47K 3/288
USPC .................................................... 4/596–614
See application file for complete search history.

(56) References Cited

U.S. PATENT DOCUMENTS

| | | | | |
|---|---|---|---|---|
| 2,454,518 A | * | 11/1948 | McCann | 4/598 |
| 2,567,506 A | * | 9/1951 | Bowman | 4/598 |
| 4,084,270 A | * | 4/1978 | Kersten, Jr. | 4/615 |
| 4,340,981 A | * | 7/1982 | Vanags | 4/536 |
| 4,983,190 A | * | 1/1991 | Verrando et al. | 95/11 |
| 5,465,438 A | * | 11/1995 | Allman et al. | 4/626 |
| 5,544,369 A | * | 8/1996 | Roberts | 4/599 |
| 5,961,697 A | * | 10/1999 | McManus et al. | 96/126 |
| 6,199,557 B1 | * | 3/2001 | Laughlin | 132/200 |
| 6,253,394 B1 | * | 7/2001 | Goyette et al. | 4/626 |
| 6,254,462 B1 | * | 7/2001 | Kelton et al. | 451/87 |
| 6,302,122 B1 | * | 10/2001 | Parker et al. | 132/333 |
| 7,131,236 B2 | * | 11/2006 | Sample et al. | 52/79.5 |
| 7,334,358 B1 | * | 2/2008 | Whyte | 37/320 |
| 7,448,096 B2 | * | 11/2008 | Schoenherr et al. | 4/601 |
| 7,979,926 B1 | * | 7/2011 | Boegler | 4/599 |
| 8,104,112 B2 | * | 1/2012 | Tsai et al. | 4/598 |
| 8,337,751 B2 | * | 12/2012 | Stewart et al. | 422/1 |
| 8,506,689 B2 | * | 8/2013 | Brestovansky et al. | 96/108 |
| 8,596,221 B2 | * | 12/2013 | Gunn et al. | 119/408 |

(Continued)

FOREIGN PATENT DOCUMENTS

GB 2124075 A * 2/1984 ............... A47K 3/22

OTHER PUBLICATIONS

ANSI/ISEA A358.1 Compliance Checklist for Safety Stations, Guardian Equipment, 2009 (1 page).

*Primary Examiner* — Lori Baker
(74) *Attorney, Agent, or Firm* — Gunn, Lee & Cave, P.C.

(57) ABSTRACT

A safety shower system having a trailer; a tank mounted to the trailer, the tank having an tank outlet, a pump having a pump inlet and a pump outlet, the pump inlet in fluid communication with the tank outlet; a valve having at least one valve inlet, a valve switch, and a valve outlet, the valve outlet fluidly connected to the pump; at least one pressure vessel having a vessel outlet, the vessel outlet fluidly connected to the at least one valve inlet; at least one conduit connected to the pump outlet; and a shower head connected to the at least one conduit.

12 Claims, 2 Drawing Sheets

(56) References Cited

U.S. PATENT DOCUMENTS

| | | |
|---|---|---|
| 8,621,682 B2* | 1/2014 | Maximilien et al. ............... 4/625 |
| 2003/0019031 A1* | 1/2003 | Mosis ................................ 4/625 |
| 2007/0193930 A1* | 8/2007 | Marsh et al. ................... 210/121 |
| 2008/0105195 A1* | 5/2008 | Vaerewyck ..................... 118/50 |
| 2008/0179346 A1* | 7/2008 | Downey ..................... 222/146.6 |
| 2010/0058532 A1* | 3/2010 | Tsai et al. ......................... 4/599 |
| 2012/0037237 A1* | 2/2012 | Rosenstein et al. ............. 137/14 |
| 2012/0041900 A1* | 2/2012 | Moreno et al. ................. 705/500 |
| 2012/0127822 A1* | 5/2012 | Noles, Jr. ................... 366/152.2 |
| 2012/0159735 A1* | 6/2012 | Raiche ............................ 15/320 |
| 2012/0260417 A1* | 10/2012 | LeBlanc ........................... 4/612 |
| 2014/0021137 A1* | 1/2014 | Smiddy et al. ................ 210/663 |
| 2014/0216437 A1* | 8/2014 | Martian et al. ......... 126/271.2 R |

* cited by examiner

SAFETY SHOWER

CROSS-REFERENCES TO RELATED APPLICATIONS

This original nonprovisional application claims the benefit of and priority to U.S. provisional application Ser. No. 61/807,648, filed on Apr. 2, 2013, which is incorporated by reference.

STATEMENT REGARDING FEDERALLY SPONSORED RESEARCH OR DEVELOPMENT

Not applicable.

BACKGROUND OF THE INVENTION

Field of the Invention

The present invention relates to safety equipment. More specifically, the present invention relates to providing a mobile safety shower capable of operation in hazardous locations without access to water or access to power.

BRIEF SUMMARY OF THE INVENTION

A safety shower system having a trailer; a tank mounted to the trailer, the tank having an tank outlet, a pump having a pump inlet and a pump outlet, the pump inlet in fluid communication with the tank outlet; a valve having at least one valve inlet, a valve switch, and a valve outlet, the valve outlet fluidly connected to the pump; at least one pressure vessel having a vessel outlet, the vessel outlet fluidly connected to the at least one valve inlet; at least one conduit connected to the pump outlet; and a shower head connected to the at least one conduit.

DETAILED DESCRIPTION OF THE SEVERAL VIEWS OF THE DRAWINGS

DETAILED DESCRIPTION OF THE VARIOUS EMBODIMENTS

Figure 1:
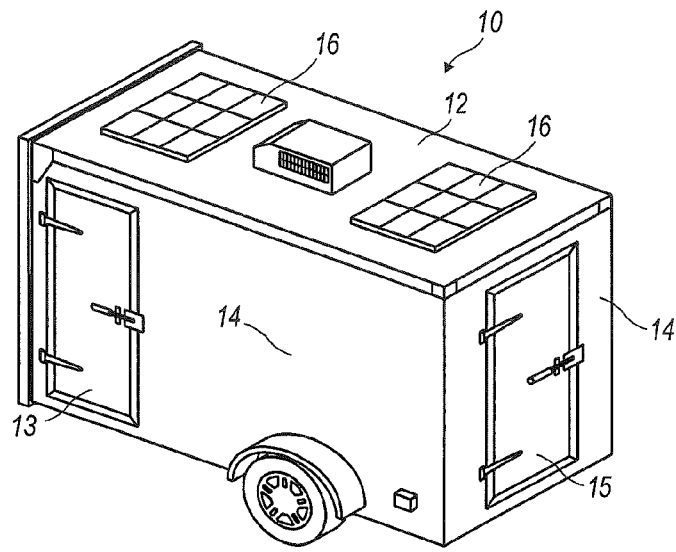
FIG. 1 is isometric view of a first embodiment of the present invention.

FIG. 1 shows a first embodiment of the invention, which includes a towable trailer 10 having a ceiling 12 and sidewalls 14. Solar panels 16 are attached to the exterior surface of the ceiling 12. A side door 13 and a rear door 15 provide two different closable entry points to the interior of the trailer 10. In the embodiment, the mobile trailer 10 may range from twelve feet to sixteen feet in length and have a width that is capable of fitting within a standard lane on a road.

Figure 2:
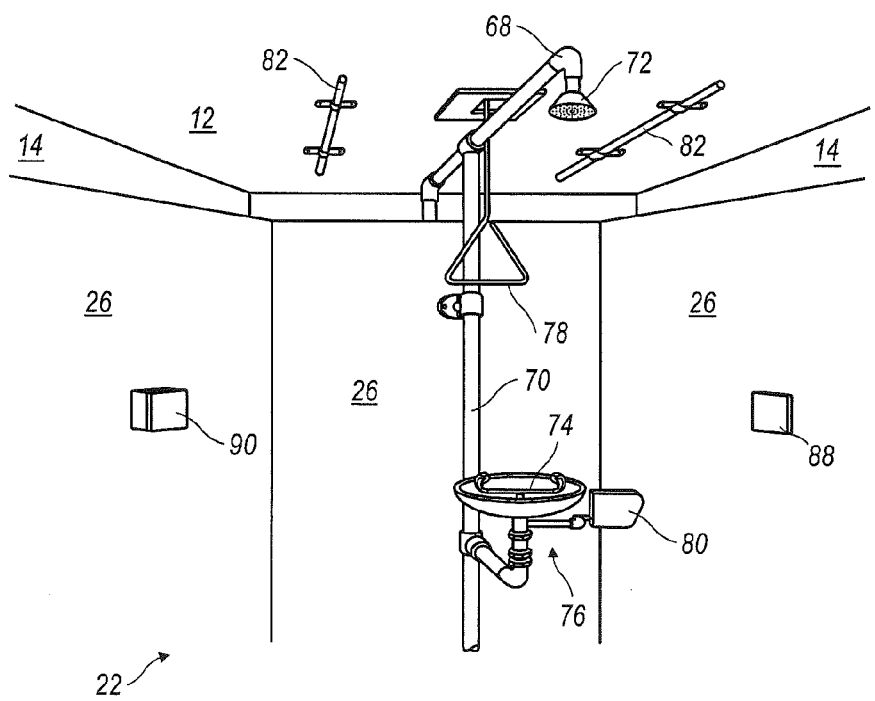
FIG. 2 shows the shower section of the first embodiment.
Figure 3:
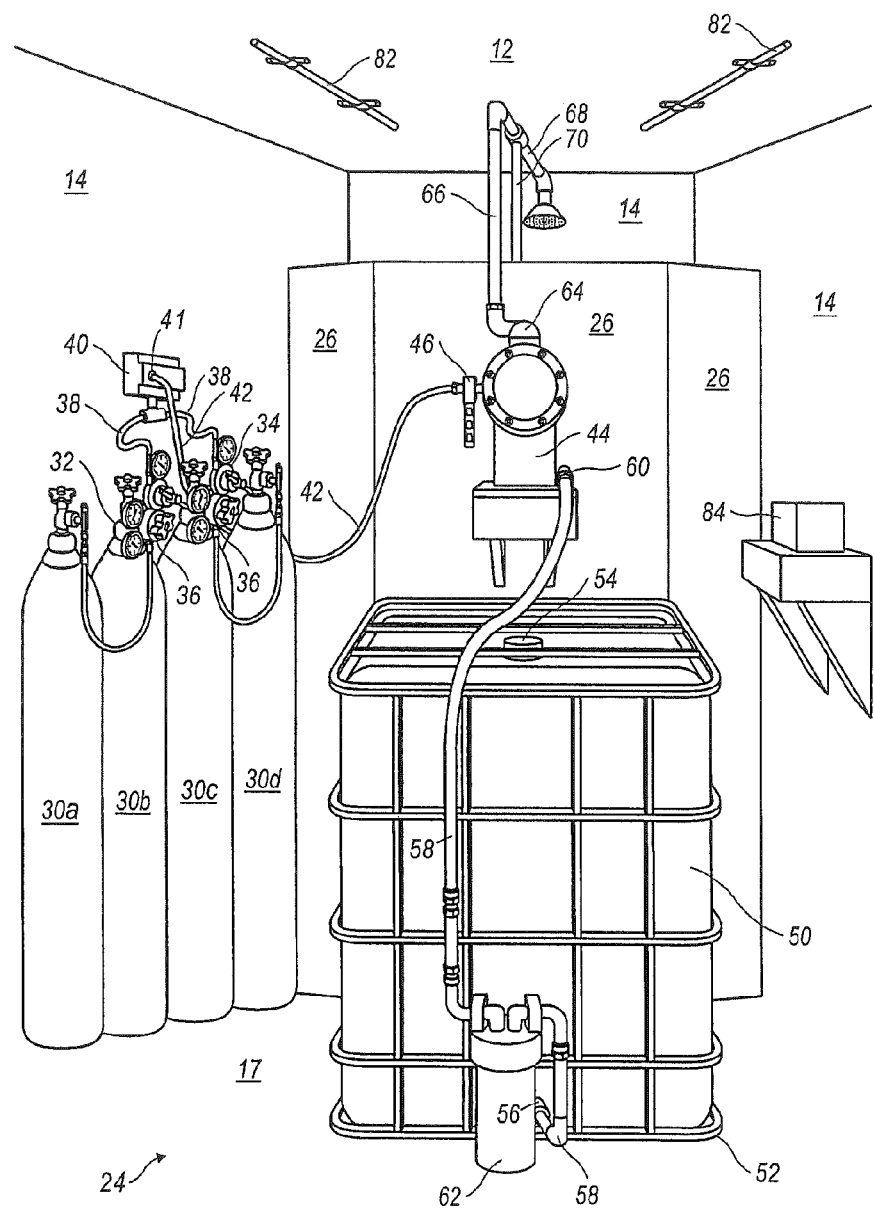
FIG. 3 shows the componentry section of the first embodiment.

Referring to FIGS. 2-3, the mobile trailer 10 is fully enclosed with a floor 17, the sidewalls 14, and the ceiling 12. The mobile trailer is divided into a shower section 22 (shown in FIG. 2) and a componentry section 24 (shown in FIG. 3). One door 13 provides an entry point into the componentry section 24, while the other door 15 provides an entry point into the shower section 22. A wall 26 separates the two sections 22, 24 but does not extend all the way to the ceiling 12. A drain (not shown) is located in the floor of the shower section 22 to remove dispensed liquid from the mobile trailer.

Referring specifically to FIG. 3, four pressurized air cylinders 30a-d are aligned along a wall 14 of the componentry section 24. The four pressurized air cylinders 30a-d contain atmospheric air, nitrogen, or other non-flammable gas and are initially pressurized to approximately forty-five hundred psi. The air cylinders 30a-d are connected in tandem so that two cylinders 30a-b are connected to a first regulator 32 and the remaining two cylinders 30c-d are connected to a second regulator 34. Each regulator 32, 34 has an inlet 36 connected to the corresponding air cylinders 30a-b, 30c-d and a single outlet line 38. The outlet line 38 of each regulator 32, 34 is connected to a pneumatic valve 40 having an outlet 41 controlled by a switch. The pneumatic valve 40 only allows one of the regulators 32, 34 and its connected tandem of air cylinders (either 30a-b or 30c-d) to supply the valve outlet 41. An air line 42 connects the outlet 41 of the pneumatic valve 40 to an air-operated double-diaphragm pump 44. An oiler 46 may be located between the pneumatic valve 40 and the double-diaphragm pump 44 to keep the diaphragms from drying out. A ground wire (not shown) is connected to the double-diaphragm pump 44 to dissipate any static electricity that may be created. The regulators 32, 34 reduce the air pressure from the air cylinders 30a-d to an outflow capable of operating the air-operated double-diaphragm pump 44. The volume of liquid to be pumped and the rate of the pumping control the amount of air regulation needed by the air regulator 32, 34.

A tank 50, capable of storing fluid such as water, is located along the floor 17 of the componentry section 24. The volume of the tank 50 may vary but has sufficient capacity to supply enough water for showers but not too much to prevent the mobile trailer 10 from being pulled. The tank 50 is secured to the mobile trailer 10 by a frame or cage 52. In an alternative embodiment, the tank 50 may be secured to the floor 17 or sidewalls 14 of the mobile trailer 10. The tank 50 may be constructed of thick rigid plastic or other suitable materials to contain liquid that have sufficient strength to hold that much water but are light enough to be utilized in a mobile trailer 10. The tank 50 may have a capped opening 54 on the top so the tank 50 may be filled. An outlet 56 is provided on one side of the tank 50 at the bottom which is connected to a tank conduit 58. The tank conduit 58 may be any sort of piping including flexible hosing, metal piping or PVC. The tank conduit 58 extends to an inlet 60 of the double-diaphragm pump 44. A filter 62 may be positioned along the tank conduit 58, between the outlet 56 of the tank 50 and inlet 60 of the double-diaphragm pump 44, so as to filter the water coming from the tank 50.

The air-controlled double-diaphragm pump 44 has an outlet 64 that is connected to a delivery conduit 66. The delivery conduit 66 extends from the componentry section 24 to the shower section 22 where it branches into a shower head conduit 68 and an eye rinse conduit 70.

Referring back to FIG. 2, the shower head conduit 68 terminates into a shower head 72 where liquid may be released. The eye rinse conduit 70 terminates into eye rinse terminals 74 where liquid may be released into a standard eye rinse station 76. A valve selectively operable between an open and closed position by a user is positioned in each of the shower head conduit 68 and the eye rinse conduit 70. When closed, no water or liquid may flow out of the respective conduits. In the disclosed embodiment, the valve controlling flow through the shower head conduit 68 is opened and closed by a triangular handle 78 that is pulled by a user. Pulling down on the triangular handle 78 opens the valve and allows water to flow through the shower head conduit 68 out the shower head 72. The valve controlling flow through the eye rinse conduit 70 is controlled by a paddle lever 80 that is pushed by a user. The valve is opened when the user pushes the paddle lever from up its vertical position down to a horizontal position. This movement opens a valve within the conduit and allows water to flow out the eye rinse terminals 74. Both the shower and eye rinse station are operated in similar means to standard ASNI safety shower and eye rinse stations.

Referring jointly to FIGS. 2-3, LED light strips 82 line the ceiling of the portable unit. Each LED light strip 82 is powered by one or more rechargeable batteries 84 located in the componentry section 24. The rechargeable batteries 84 are recharged through energy obtained from the solar panels/cells 16 located on the exterior top of the mobile trailer 10 (see FIG. 1). A light switch 90, operable by a user in the shower section 22, may turn on and off the LED light strips 82. The LED light strips 82 provide lighting to the componentry section 24 and the shower section 22.

Operation of the embodiment is initially described with reference to FIG. 3. In operation, compressed air from a pair of air cylinders (either 30a-b or 30c-d) flows through its respective regulator (either 32 or 34), which reduces the pressure and air flow to between twenty-five and one-hundred twenty-five psi, depending on the size of the double-diaphragm pump 44 and the desired flow rate of the liquid. Each regulator 32, 34 outflows to the pneumatic valve 40. Once the pneumatic valve 40 is opened, compressed air flows through the air line 42 from the oiler 46 to the air-controlled double-diaphragm pump 44. Once the compressed air accesses the double-diaphragm pump 44, a suction force is created drawing water from the tank 50, through the tank conduit 58, to the inlet 60 of the double-diaphragm pump 44. Through action of the double-diaphragm pump 44, as powered by the compressed air, the water is pumped from the pump inlet 60 to the pump outlet 64 where the water enters the delivery conduit 66.

Referring back to FIG. 2, water from the delivery conduit 66 then proceeds to branch into the shower head conduit 68 and eye rinse conduit 70 where the water is either stopped or allowed to flow depending on the positioning of the shower head conduit valve (operated by handle 78) and the eye rinse conduit valve (operated by handle 80). If either of the shower head conduit valve and the eye rinse conduit valve is open, the double-diaphragm pump 44 continues to operate sucking in water from the water tank 50 through the pump 44 and out the outlet 64. However, if the shower head conduit valve and the eye rinse conduit valve are closed, the pressure builds in the shower head conduit 68, eye rinse conduit 70, delivery conduit 68, and in the double-diaphragm pump 44. Once the pressure in the double-diaphragm pump 44 equals the pressure of the compressed air, the double-diaphragm pump 44 enters equilibrium and the diaphragms no longer operate. The result is a pressurized conduit extending from the outlet 64 of the double-diaphragm pump 44 and a non-pressurized inlet conduit 60 from the water tank 50. This keeps the water tank 50 non-pressurized.

Operation of the valve for the shower head 72 is controlled by manual operation of the triangular handle 78 by the user. Pulling down on the triangular handle 78 pulls down a lever that opens a valve in the shower head conduit 68 allowing water to flow through the shower head 72. For the eye rinse station 76, the paddle lever 80 is provided in which the user pushes the paddle lever 80 from up its vertical position down to a horizontal position. This movement opens the valve within the conduit 70 and allows water to flow out the eye rinse terminal 74. Once either of the valves is opened, the pressure in the double-diaphragm pump 44 decreases and the compressed air causes the double-diaphragm pump 44 to begin operating again. This operation results in water being drawn in from the tank 50, into the double-diaphragm pump 44, and into the delivery conduit 66.

Release of the paddle lever 80, or release of the triangular lever 78, closes the respective valve, allowing pressure to build in the pump outlet 64. Once the pressure reaches equilibrium with the compressed air supplying the double diaphragm pump 44, the suction of water from the tank 50 ceases.

A backup switch 88 is located within the shower section 22 in case opening the shower head conduit valve or the eye rinse conduit valve results in no flow or decreased water pressure. Pushing the switch 88 activates the pneumatic switch that controls the pneumatic valve 40. Operation of the switch 88 results in the pneumatic valve 40 switching to the other regulator supplied by the other pair of air cylinders.

The embodiment is designed for use as a standard ASNI safety showers and eye rinse stations. However, other mechanisms for controlling the valves are envisioned including levers that keep the valves open without continual manual operation. In this embodiment, the safety shower would operate more like a traditional shower allowing continual flow of water without continual user operation.

The safety shower system operates without the use of any flammable gases or use of any spark. As a result, the safety shower may be utilized in environments where flammable gases are present. Additionally, the system operates without the need of a separate power source such as a light tower or generator.

In another embodiment, an air conditioner unit may be installed to cool the mobile trailer to ensure proper operation and maintain comfort for the users. This embodiment would not be self-powered or intrinsically safe, but would remain portable without need to connect to a water source.

In a further embodiment, other lights such as incandescent or fluorescent bulbs may be used.

The present invention is described in terms of an embodiment of a specifically-described safety shower and alternative embodiments thereof. Those skilled in the art will recognize that alternative constructions of such an apparatus can be used in carrying out the present invention. Other aspects, features, and advantages of the present invention may be obtained from a study of this disclosure and the drawings, along with the appended claims.

I claim:

1. A safety shower system comprising:
    a trailer;
    a tank mounted to the trailer, the tank having an tank outlet;
    a double diaphragm, fluid-operated pump having a first pump inlet, a second pump inlet, and a pump outlet, the first pump inlet fluidly connected with the tank outlet;
    a valve having at least one valve inlet, a valve switch, and a valve outlet, the valve outlet fluidly connected to the second pump inlet;
    at least one pressure vessel having a vessel outlet and containing a pressurized non-flammable fluid, the vessel outlet fluidly connected to the at least one valve inlet;
    at least one conduit connected to the pump outlet; and
    a shower head connected to the at least one conduit.

2. The system of claim 1 wherein the at least one valve inlet comprises a first valve inlet and a second valve inlet and said at least one pressure vessel comprises a first pressure vessel fluidly connected to the first valve inl+et and a second pressure vessel fluidly connected to the second fluid inlet.

3. The system of claim 1 further comprising a manually operable valve between said at least one conduit and said at least one fluid outlet.

4. The system of claim 3 wherein said at least one fluid outlet is a shower head.

5. The system of claim 3 wherein said at least one fluid outlet is an eye rinse station.

6. The system of claim 1 further comprising an oiler fluidly connected between said valve and said pump.

7. The system of claim 1 wherein said valve is a pneumatic valve.

8. The system of claim 1 further comprising a filter fluidly connected between the tank and the pump.

9. The system of claim 1 further comprising a filter fluidly connected between the tank and the pump.

10. The system of claim 1 wherein said trailer comprises a floor, at least one sidewall, a ceiling, and a wall extending from the floor toward the ceiling to define a first section and a second section.

11. The system of claim 1 wherein said fluid outlet occupies the first section.

12. A safety shower system comprising:
- a towable trailer having a floor, at least one sidewall, a ceiling, and a wall extending between two opposing sidewalls and from the floor toward the ceiling to define a first section on one side of the wall and a second section on the other side of the wall;
- a tank mounted to the towable trailer in the first section, the tank having an tank outlet;
- a double diaphragm, fluid-operated pump in the first section, the pump having a first pump inlet, a second pump inlet, and a pump outlet, the first pump inlet fluidly connected with the tank outlet;
- a valve in the first section, the valve having at least one valve inlet, a valve switch, and a valve outlet, the valve outlet fluidly connected to the second pump inlet;
- at least one pressure vessel in the first section, the pressure vessel containing a pressurized non-flammable fluid and having a vessel outlet, the vessel outlet fluidly connected to the at least one valve inlet;
- at least one conduit connected to the pump outlet; and
- a shower head in the second section and connected to the at least one conduit.

* * * * *